(12) United States Patent
Cesaretti et al.

(10) Patent No.: US 8,333,405 B2
(45) Date of Patent: Dec. 18, 2012

(54) SYSTEM FOR BLOCKING THE AESTHETIC LINING ON DASHBOARD OF A VEHICLE ENSURING PROPER OPENING OF THE INTEGRATED AIR BAG DOOR

(75) Inventors: Antonio Cesaretti, Modena (IT); Pierluigi Piciarelli, Modena (IT); Roberto Lamberti, Modena (IT)

(73) Assignee: Maserati S.p.A., Modena (IT)

( * ) Notice: Subject to any disclaimer, the term of this patent is extended or adjusted under 35 U.S.C. 154(b) by 0 days.

(21) Appl. No.: 13/092,477

(22) Filed: Apr. 22, 2011

(65) Prior Publication Data

US 2012/0049490 A1    Mar. 1, 2012

Related U.S. Application Data

(63) Continuation of application No. PCT/IT2009/000475, filed on Oct. 22, 2009.

(30) Foreign Application Priority Data

Oct. 24, 2008 (IT) .............................. RM2008A0570

(51) Int. Cl.
    *B60R 21/215* (2011.01)

(52) U.S. Cl. ................................................... 280/728.3
(58) Field of Classification Search ............... 280/728.3, 280/731, 732
See application file for complete search history.

(56) References Cited

U.S. PATENT DOCUMENTS

| 5,678,851 | A  | * | 10/1997 | Saito et al. | ................. | 280/728.3 |
| 5,806,880 | A  | * | 9/1998 | Gray | .......................... | 280/728.3 |
| 6,695,344 | B2 | * | 2/2004 | Hauer | ............................ | 280/731 |
| 6,817,624 | B2 | * | 11/2004 | Lorenz et al. | ............... | 280/728.2 |
| 6,942,246 | B2 | * | 9/2005 | Hohne et al. | .................. | 280/731 |
| 7,748,731 | B2 | * | 7/2010 | Taniyama et al. | ........... | 280/728.2 |
| 7,766,371 | B2 | * | 8/2010 | Fujimori et al. | ............. | 280/728.3 |
| 2001/0045728 | A1 | * | 11/2001 | Kansteiner et al. | ......... | 280/728.3 |
| 2002/0121769 | A1 | * | 9/2002 | Lorenz et al. | ............... | 280/728.3 |
| 2003/0025306 | A1 | * | 2/2003 | Kobayashi et al. | ......... | 280/728.2 |

\* cited by examiner

*Primary Examiner* — Drew Brown
(74) *Attorney, Agent, or Firm* — Gesmer Updegrove LLP

(57) ABSTRACT

The invention concerns a system for blocking the aesthetic lining of a dashboard, ensuring proper opening of integrated air bag door (5), comprising a list (2), flush within a channel (8) for opening the door (5) containing air bag, outer with respect to dashboard (1) lining (4), and provided with at least a tooth (3) entering within the lining, thus ensuring a symmetrical opening of air bag.

5 Claims, 3 Drawing Sheets

SYSTEM FOR BLOCKING THE AESTHETIC LINING ON DASHBOARD OF A VEHICLE ENSURING PROPER OPENING OF THE INTEGRATED AIR BAG DOOR

The present application is a continuation of PCT/IT2009/000475 filed on 22 Oct. 2009, which claims priority to Italian Patent Application No. RM2008A000570 filed on 24 Oct. 2008.

The present invention relates to a system for blocking the aesthetic lining of a dashboard, ensuring proper opening of integrated air bag door.

More specifically, the invention concerns a system of the above kind permitting ensuring proper opening of integrated air bag door, even with lining having a spongy substrate and synthetic or natural surface layer.

The solution according to the invention can be applied to inner fiction elements (dashboard and panels) with integrated (not visible) air bag and coated with a spongy substrate and synthetic or natural surface layer.

At present, all medium-high segment vehicles are provided with passenger side air bag, the opening door of which is integrated within the dashboard shell.

In order to permit proper opening of the door, it is usually realized a series of microholes, realized by laser, that, in function of their depth and pitch, make it more or less high the load necessary for opening the same door by the air bag.

Said method is particularly applied on dashboards having an integrated air bag door and its main advantage is the possibility of using the same machinery for different applications.

Other solutions presently employed for lower productions and with "saddled" dashboards or panels comprises the use of aesthetic stitching with a fragile yarn in order to hide holes passing through the rigid support, thus ensuring the proper opening of the door.

However, particularly the first technical solution described in the above is characterized by aesthetic problems when spongy materials are employed as aesthetic lining: in fact, microholes are not passing-through, thus creating a breakage of the foam cells that can be observed from outside due to the local depression.

Furthermore, said weakening solution is not sufficient in case synthetic coating materials are employed, such as the lining known by the trade name Benova®.

Similar aesthetic problems exist for not-foamed dashboards.

Furthermore, another problem is the high industrialization cost for the laser working process (laser machine and specific apparatuses for positioning dashboard—panel), which is expensive for niche applications or small amounts of products, In view of the above, and in order to solve the above mentioned problems, the Applicant has realized a system comprised of a plastics or metallic list, permitting solving all the above drawbacks.

It is therefore specific object of the present invention a system for blocking the aesthetic lining of a dashboard, ensuring proper opening of integrated air bag door, characterized in that it comprises a list, flush within a channel for opening the door containing air bag, outer with respect to dashboard lining, and provided with at least a tooth entering within the lining, thus ensuring a symmetrical opening of air bag, Preferably, according to the invention, a spongy material layer is provided between said door and said lining, said list being flush with the channel for breaking said spongy layer.

Still according to the invention said list provides a plurality of teeth.

Always according to the invention, said list is coupled by inner screws.

Furthermore, according to the invention, it is provided a plurality of lists.

The present invention will be now described, for illustrative but not limitative purposes, according to its preferred embodiments, with particular reference to the figures of the enclosed drawings, wherein.

Figure 1:
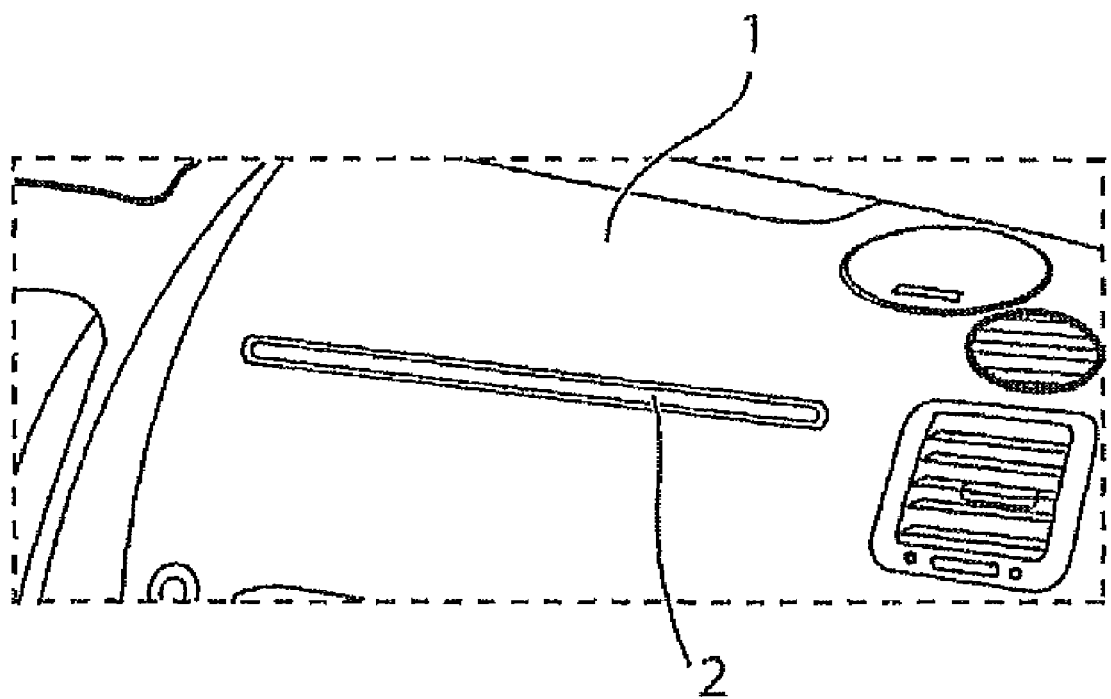
FIG. 1 is a perspective view of a dashboard with the system according to the invention.

Observing the enclosed figure, it is observed an embodiment of a system according to the invention providing (FIG. 1), on a dashboard generically indicated by reference number 1, a lining, on which a list 2 is applied, that will be described in greater detail in the following.

Figure 2:
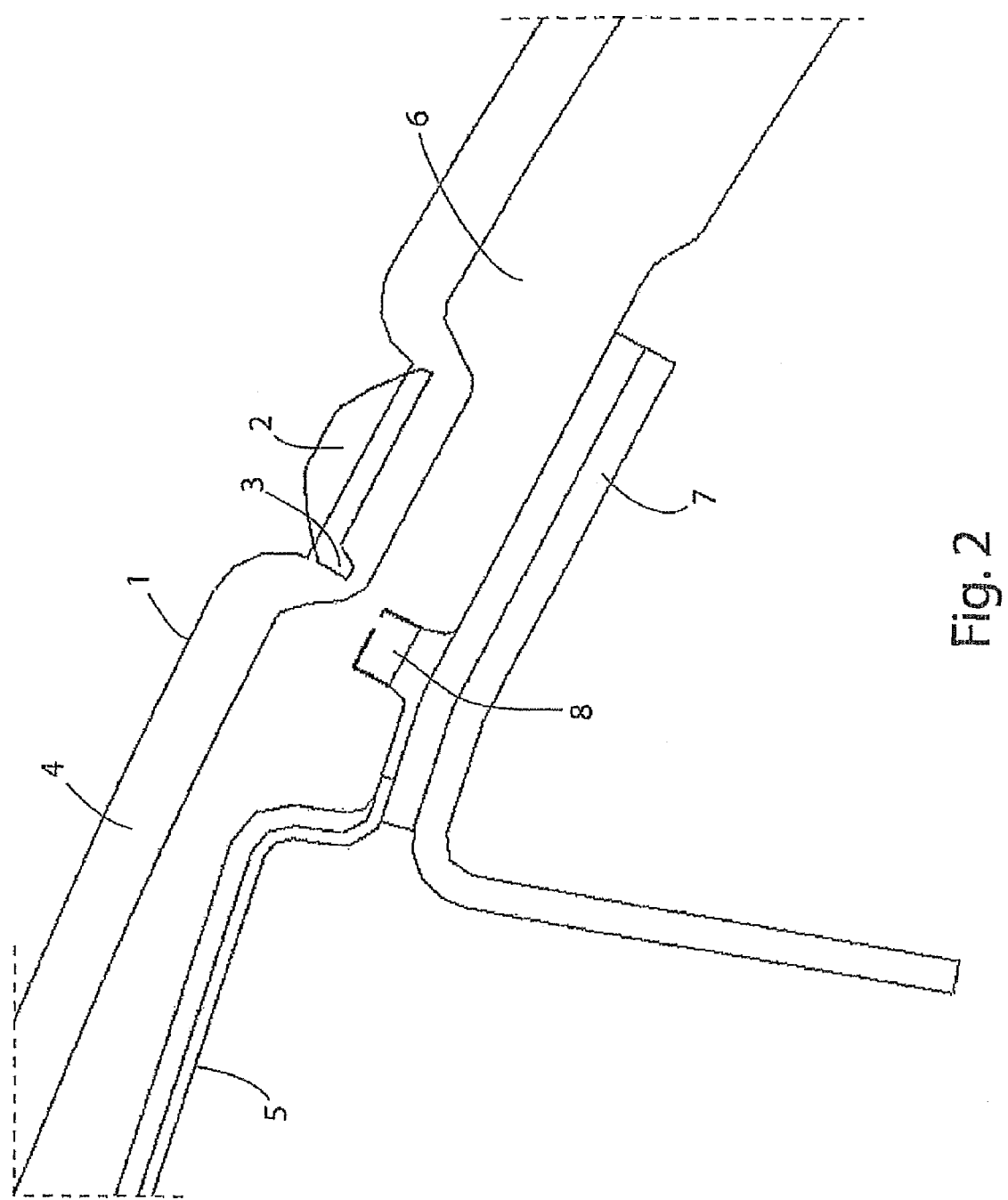
FIG. 2 is a first section view of a system according to the invention.
Figure 3:
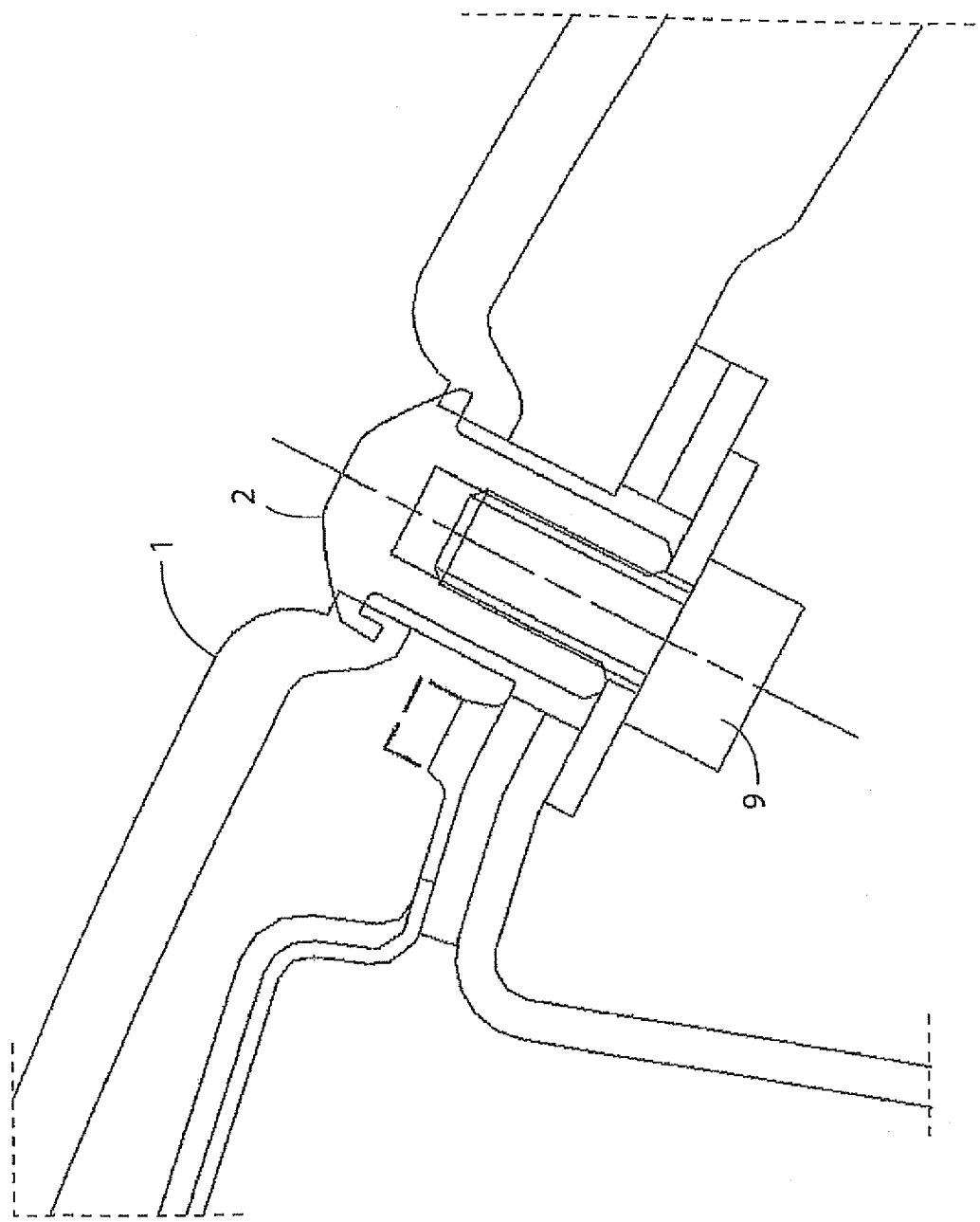
FIG. 3 is a second section view of the system according to the invention.

Observing sections of FIGS. 2 and 3, it is observed list 2, provided with teeth 3, "grasping" the lining 4 of the dashboard 1. Said list 2 is flush mounted with the door 5.

Furthermore, from FIGS. 2 and 3 it is possible observing spongy material thickness 6, air bag guide bracket 7, a channel 8, obtained by milling said spongy material.

Said list (FIG. 3) is fixed on dashboard 1 by screws 9. As already said, list 2 is placed flush with the door 5 opening channel 8 and along the contact line has a tooth 3, which is necessary for creating a localised weakening of the lining material 4, permitting obtaining a quick cutting of the same lining (natural or artificial skin).

From the above description it is understood that when air bag starts inflating and exerting its pressure against door 5, clean breakage of outer lining 4 occurs, thus preventing asymmetric opening of the same door 5 and air bag pressure increase that can influence performances of the same (not symmetric deployment and longer deployment time).

The present invention has been described for illustrative but not limitative purposes, according to its preferred embodiments, but it is to be understood that modifications and/or changes can be introduced by those skilled in the art without departing from the relevant scope as defined in the enclosed claims.

The invention claimed is:

1. A system for blocking the aesthetic lining of a dashboard, ensuring proper opening of an integrated air bag door, characterized in that it comprises a list that is flush within a channel for opening the door containing an air bag, said list being disposed on an outer surface of the dashboard lining, and provided with at least a tooth entering within the lining, thus ensuring a symmetrical opening of the air bag.

2. The system for blocking the aesthetic lining of a dashboard according to claim 1, characterized in that a spongy material layer is provided between said door and said lining.

3. The system for blocking the aesthetic lining of a dashboard according to claim 1, wherein said list provides a plurality of teeth.

4. The system for blocking the aesthetic lining of a dashboard according to claim 1, wherein said list is coupled by inner screws.

5. The system for blocking the aesthetic lining of a dashboard according to claim 1, wherein it is provided a plurality of lists.

* * * * *